United States Patent
Nave et al.

(10) Patent No.: US 7,408,783 B2
(45) Date of Patent: Aug. 5, 2008

(54) METHOD AND APPARATUS FOR SAFELY SHIPPING TAPE DRIVES WHILE MOUNTED INSIDE A FRAME OF AN AUTOMATED TAPE LIBRARY

(75) Inventors: Shawn M. Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 10/464,326

(22) Filed: Jun. 18, 2003

(65) Prior Publication Data

US 2004/0261087 A1 Dec. 23, 2004

(51) Int. Cl.
*G06F 1/16* (2006.01)
(52) U.S. Cl. .............................. 361/724; 705/4; 720/601
(58) Field of Classification Search ................. 361/679, 361/685, 724–727
See application file for complete search history.

(56) References Cited

U.S. PATENT DOCUMENTS

| | | | |
|---|---|---|---|
| 5,361,481 A * | 11/1994 | Lloyd et al. ................... 29/469 |
| 6,166,900 A * | 12/2000 | Flynn et al. .................. 361/685 |
| 6,272,007 B1 * | 8/2001 | Kitlas et al. .................. 361/683 |
| 6,273,697 B1 * | 8/2001 | Harfmann .................... 425/4 C |
| 6,288,902 B1 * | 9/2001 | Kim et al. .................... 361/725 |
| 6,297,954 B1 * | 10/2001 | Seo ............................. 361/686 |
| 6,373,697 B1 * | 4/2002 | Lajara et al. ................. 361/687 |
| 6,388,873 B1 * | 5/2002 | Brooks et al. ............... 361/685 |
| 6,388,875 B1 * | 5/2002 | Chen ........................... 361/685 |
| 6,498,723 B1 * | 12/2002 | Konshak et al. ............. 361/685 |
| 6,542,362 B2 * | 4/2003 | Lajara et al. ................. 361/687 |
| 2002/0120475 A1 * | 8/2002 | Morimoto ..................... 705/4 |

* cited by examiner

*Primary Examiner*—Lisa Lea-Edmonds
(74) *Attorney, Agent, or Firm*—Dillon & Yudell LLP

(57) ABSTRACT

A system of shipping tape drives while they are mounted to a frame uses shipment brackets to retain the drives within the frame in retracted positions during shipment. The brackets allow the drives to be shipped inside the frame. The brackets hold the drives in the retracted position within the frame by clipping into the drives and the shelves above the drives. Tabs on each bracket snap into a drive such that the drive cannot move with respect to the bracket or the shelf. The drive is pushed into position until the bracket is fully engaged with the shelf above the drive and the tabs have prevented the drive from further insertion. Because the bracket is engaged, the drive no longer can move in or out of the shelf.

6 Claims, 3 Drawing Sheets

METHOD AND APPARATUS FOR SAFELY SHIPPING TAPE DRIVES WHILE MOUNTED INSIDE A FRAME OF AN AUTOMATED TAPE LIBRARY

BACKGROUND OF THE INVENTION

1. Technical Field

The present invention relates in general to an improved shipping apparatus and method and, in particular, to an improved method and apparatus for safely shipping tape drives while they are located inside a frame of an automated tape library.

2. Description of the Prior Art

Protecting and safely handling sensitive electronic components during shipment is a challenge for electronics goods manufacturers. Shipping electronic components that are required to be mounted inside their respective end product carriers or storage devices can be especially difficult, particularly when the components are required to protrude out of their carriers under normal operating conditions. As shown in FIG. 1, one example of this type of problem is encountered with tape drives 11 that are mounted in an automated tape library frame 13 for interaction with a robotic picker (not shown).

There are typically two ways to address the safe handling and shipment of tape drives and their frames. One solution is to ship the drives and the frame separately. Although this first solution has the advantage of being better able to protect the electronics, it has several disadvantages as well. A drawback to this first solution is that when the parts are shipped separately they can get misplaced, lost, or not arrive at their destination at the same time. Another drawback is that a special shipping container must be made in order to ship the drives. Also, the installation time at the destination is increased as the drives must be put into the frame instead of the drives already being located in the frame. Furthermore, if the end user wishes to move the entire frame after the initial installation, all of the shipping containers must be present in order to do this safely. Thus, shipping the drives separately from the frame has many disadvantages which add significant cost to the product.

The other alternative solution for tape drives and their frame is to ship the drives in their normal operating position where they protrude out of the frame while packed inside a large protective cover for the drives. This solution also has several disadvantages, including that such a protective cover is expensive to build. In addition, the bulk of the weight of the drives is located outside the frame. When the frame is moved during shipping, it can tip over due to the center of gravity not being located in the center of the frame. Thus, both prior art solutions still lack the ability to ship the product safely and cost effectively. An improved method and apparatus for facilitating safe and cost effective shipment of tape drives in a frame is needed and would be desirable.

SUMMARY OF THE INVENTION

One embodiment of a system, apparatus, and method of safely shipping drives, such as tape drives, while they are mounted to the frame of an automated tape library utilizes shipment brackets to retain the drives within the frame in retracted positions during shipment. The shipment brackets allows the drives to be shipped inside the frame when the normal operating position of the drives is to protrude outside of the frame. This design provides a very simple installation and removal solution without adding the extra cost of separate shipping containers for the drives. Also, by moving the drives into the frame, the majority of the weight is now inside the frame so that the frame will not tip over as easily as prior art designs and thereby avoid a safety hazard during shipment. Additionally, the shipment brackets are relatively inexpensive and can be stored within the frame so that the frame can be shipped repeatedly without having to relocate the original packaging.

The function of the shipment bracket is to securely hold and restrain one drive in the frame in a retracted or shipment position. This position differs from the normal operating position of the drive wherein it protrudes from the frame. Prior to the present invention, there was no viable method of securely fastening drives within the frame in retracted positions that allowed them to be easily removed.

The shipment bracket holds the drive in the retracted position within the frame by clipping or snapping into the drive itself and also the frame in which the drive is located. Two small vertical tabs on the outside legs of the spring clip into two holes in the drive such that the drive cannot move with respect to the spring in the direction in or out of its shelf. When the spring is clipped on top of the drive, the drive and spring assembly are inserted into the shelf. When the drive is inserted into the shelf, the middle section of the spring is ramped down as the drive slides into position. The drive continues to be pushed into position until the middle section of the spring is fully engaged with the shelf above the drive and the vertical tabs in the middle section have prevented the drive from further insertion. Because the middle section of the spring is engaged, the drive no longer can move in or out of the shelf. Also in this position, the middle section of the spring is compressed and applies a downward force to the top of the drive. The compression force securely maintains the position of the drive during any shock or vibration during shipping. In one embodiment, the spring may be disengaged by a lever (such as a screwdriver) which is used to pry down the middle section of the spring to disengage and then slide the drive out of the shelf. Once disengaged, the spring can be removed and stored within the frame.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 2:
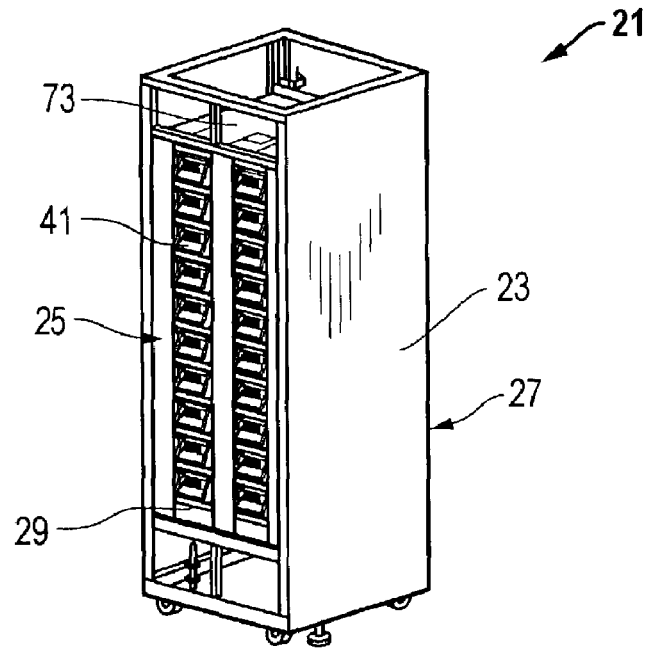
FIG. 2 is an isometric view of one embodiment of a frame for an automated tape library having a plurality of tape drives shown in retracted positions and is constructed in accordance with the present invention.

Referring to FIGS. 2-5, one embodiment of a system for reconfiguring an apparatus comprises a system 21 for increasing the safe handling of the apparatus during shipping. In the embodiment shown, the apparatus is a frame 23 for an automated tape library (not shown). The automated tape library has a robotic picker that picks components, such as tape cartridges, from and places components into tape drives within the frame 23. The frame 23 has a front 25, a rear 27, and a plurality of shelves 29 (twenty are shown in FIG. 2) located inside the frame 23. Each of the shelves 29 has a shelf axis 31 (FIG. 5) that extends generally in forward and reverse directions (indicated by arrows 33, 35, respectively).

The system 21 also includes a plurality of components or drives 41 (twenty are shown in FIG. 2), such as data tape drives for recording information. In one version, each of the drives 41 is mountable in any one of the shelves 29 of the frame 23. Each of drives 41 also has a plurality of apertures 43 (FIG. 4) formed therein. In the embodiment shown, at least some of the apertures 43 are formed in a top surface 45 of the drives 41.

Figure 3:
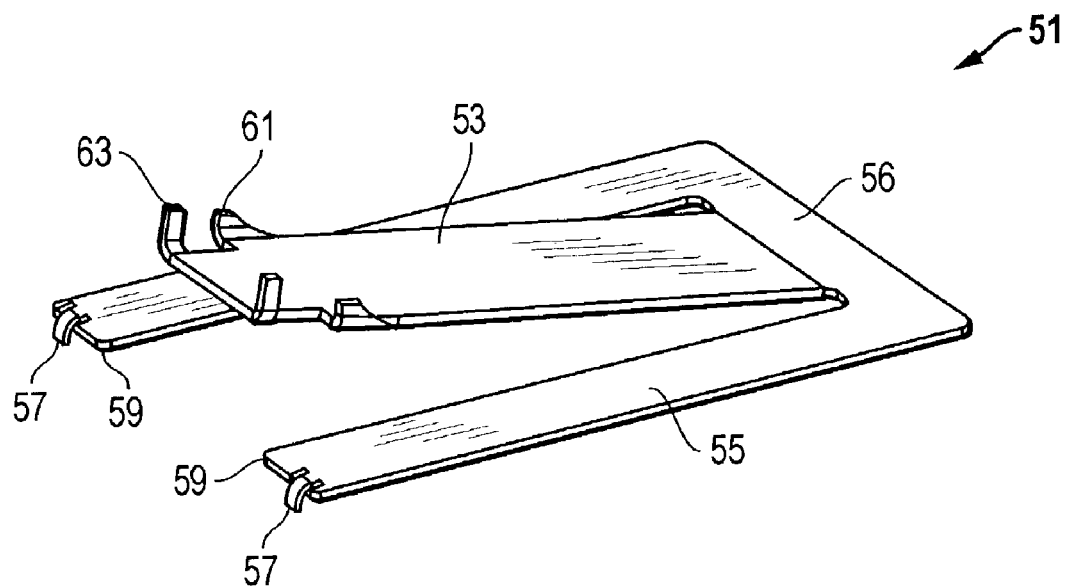
FIG. 3 is an isometric view of one embodiment of a shipment bracket for mounting and retaining a tape drive in a frame and is constructed in accordance with the present invention.
Figure 4:
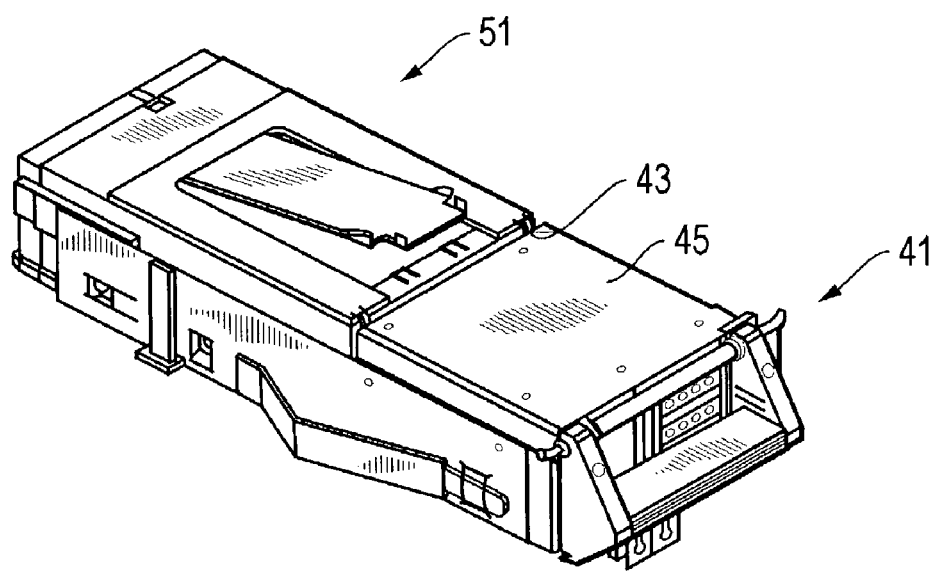
FIG. 4 is an isometric view of the shipment bracket of FIG. 3 shown mounted to a tape drive and is constructed in accordance with the present invention.

Referring now to FIG. 3, another component of system 21 is a plurality of retention devices or shipping brackets 51 (one shown). In one embodiment, the drives 41 and shipping brackets 51 are provided in equal numbers. Each of the shipping brackets 51 has a shelf portion 53 that is releasably attachable to any one of the shelves 29, and a drive portion 55 that is releasably attachable to any one of the drives 41. In the embodiment shown, drive portion 55 is a generally flat, U-shaped member with a base portion 56, and a downward-depending tab 57 on the outer corner of the end of each of its arms 59. As shown in FIG. 4, tabs 57 engage respective ones of the apertures 43 in the drive 41 when drive portion 55 of shipping bracket 51 is mounted on the top surface 45 thereof.

Referring again to FIG. 3, the shelf portion 53 is a generally flat member that is integrally formed with drive portion 55 at base portion 56 and extends in the same general direction as arms 59. However, shelf portion 53 is not co-planar with drive portion 55; rather, shelf portion 53 is oriented at an acute angle (approximately 5 to 30 degrees) with respect to drive portion 55 above the planar surface defined by drive portion 55. Because of this configuration, shelf portion 53 acts as a spring and is spring biased upward from drive portion 55 to its inclined position. Shelf portion 53 includes two pair of generally upward-depending tabs 61, 63 which are spaced apart from each other along the longitudinal length of shelf portion 53. Each pair of tabs 61, 63 is longitudinally aligned, respectively, but they are formed as mirror-images. Tabs 61 are somewhat triangular, and tabs 63 are generally rectangular. In addition, tabs 61 are spaced slightly farther apart from each other and slightly shorter than tabs 63.

Figure 5:
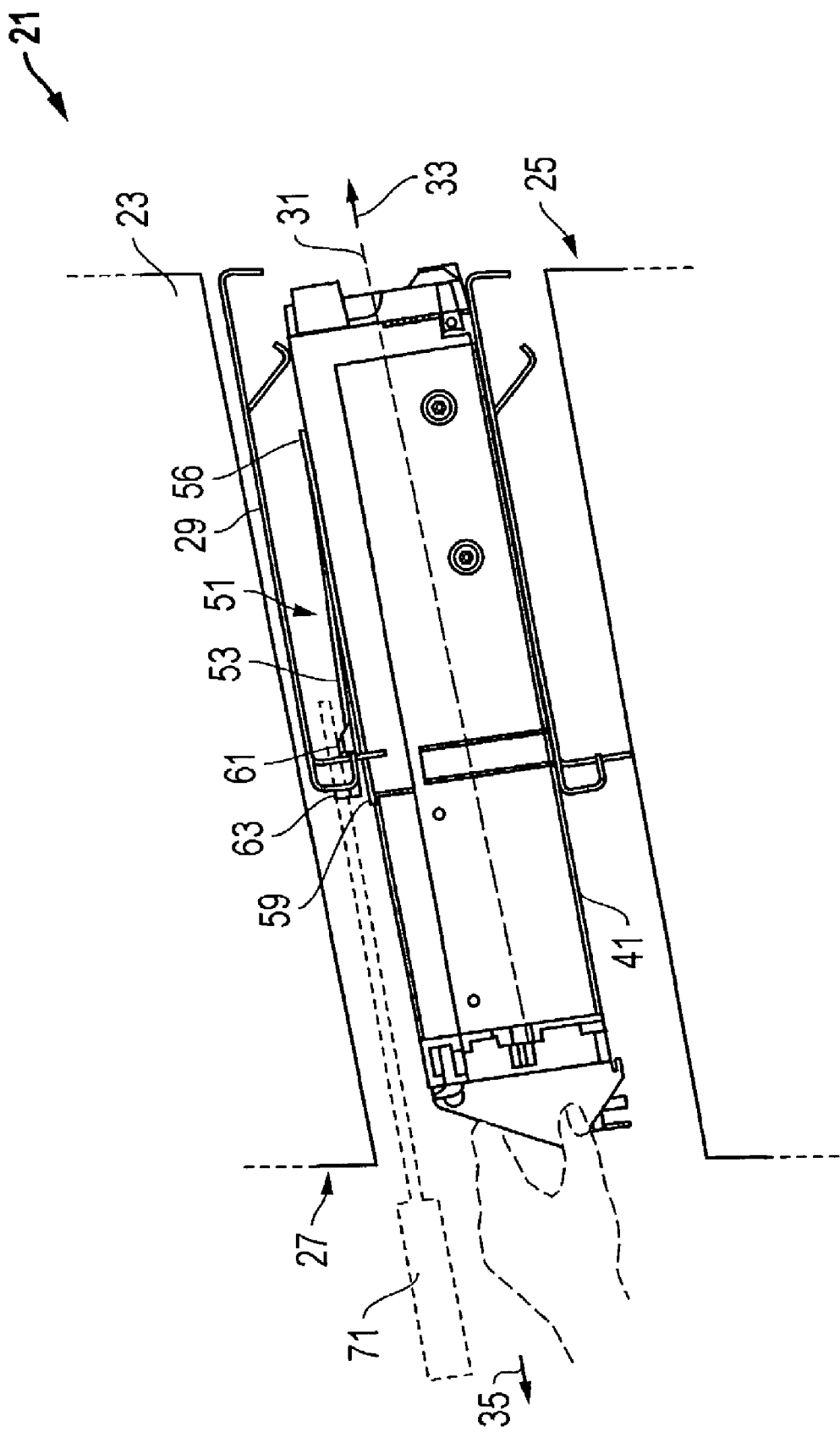
FIG. 5 is a sectional side view of the shipment bracket and tape drive of FIG. 4 shown mounted in a retracted position in a frame and is constructed in accordance with the present invention.

As shown in FIGS. 2 and 5, the drives 41 are positionable in a retracted or shipping position by mounting the shipping brackets 51 to the drives 41 and inserting the drives 41 from the rear 27 of the frame 23 into the shelves 29 until the shelf portions 53 of the shipping brackets 51 interlock with the shelves 29 to restrict movement of the drives 41 located therein. Each of the shelf portions 53 of the shipping brackets 51 acts as a spring that interlocks with upper features of a respective one of the shelves 29 without a tool by merely inserting the drives 41 into the shelves 29. However, in one embodiment, a lever or tool 71 (such as a screwdriver) may be used to pry the shelf portion 53 downward to disengage the tabs 61, 63 from the shelf 29 before the drive 41 can be removed from the frame 23. Alternatively, drive 41 may be removed without tools by pressing down on the shelf portion 53.

The shelf portions 53 of the shipping brackets 51 apply a compression force to the drives 41 that, in one embodiment, is approximately equal to three times the weight of one of the drives 41 to maintain the drives 41 in the shipping position during shock and vibration encountered while being shipped. In one embodiment, the drives 41 are located completely inside the frame 23 when in the shipping position. When the drives 41 are in the shipping position, a majority of the weight of the drives 41 is located over the center of the frame 23 such that the tilt stability of the frame 23 is enhanced.

Figure 1:
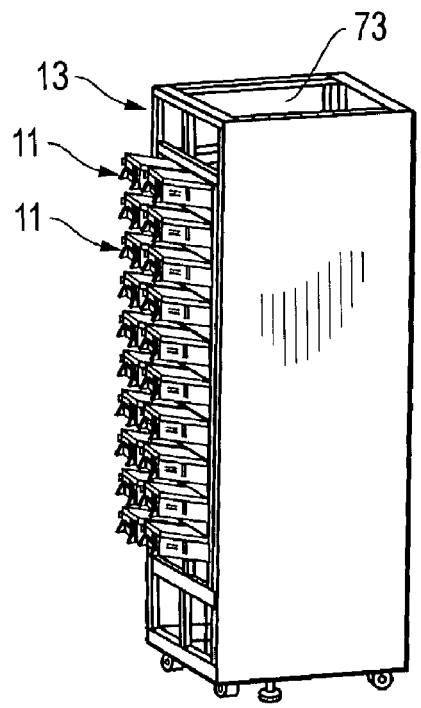
FIG. 1 is an isometric view of a conventional frame for an automated tape library having a plurality of tape drives shown in their conventional operating positions.

From the shipping position of FIGS. 2 and 5, the drives 41 are repositionable to an extended or normal operating position (see FIG. 1) by partially removing the drives 41 from the rear 27 of the frame 23, removing the shipping brackets 51 from the drives 41, and re-inserting the drives 41 from the rear 27 of the frame 23 into the shelves 29 beyond the shipping position toward the front 25 of the frame 23. When the drives 41 are in the normal operating position, the shipping brackets 51 may be stored inside the frame 23 (such as a shelf or in a compartment 73) for subsequent use in retaining the drives 41 in the shipping position at a later time. In the normal operating position, at least portions (such as front portions) of each of the drives 41 protrude beyond the front 25 of the frame 23 when the drives 41 are in the normal operating position.

In operation, the present invention also comprises a method of increasing the safe handling of an apparatus, such as system 21, during shipping. In one embodiment, the method comprises providing a frame 23 (FIG. 2) having a front 25, a rear 27, shelves 29 inside the frame 23, drives 41, and shipping brackets 51 (FIG. 3). A shipping bracket 51 is mounted to each of the drives 41 to form assemblies (FIG. 4). The assemblies are inserted into the shelves 29 at the rear 27 of the frame 23 until the shipping brackets 51 interlock with the shelves 29 in a shipping position (FIG. 2) such that the drives 41 are located completely inside the frame 23 between the front 25 and the rear 27 of the frame 23 and movement of the drives 41 is restricted by the shipping brackets 51. The frame 23 is shipped with the drives 41 in the shipping position. When ready to be put in an operational position, the assemblies are partially removed from the rear 27 of the frame 23 and the shipping brackets 51 are removed from the drives 41. The drives 41 are then fully inserted into the shelves 29 from the rear 27 of the frame 23 beyond the shipping position to a normal operating position such that at least portions of the drives 41 extend out of the frame 23 beyond the front 25 of the frame 23.

Alternatively, the method further comprises the step of storing the shipping brackets 51 inside the frame 23 for subsequent use in retaining the drives 41 in the shipping position at a future date. The method may also comprise locating a majority of the weight of the drives 41 inside the frame 23 at or near the center of gravity of the frame 23 in order to enhance the tilt stability of the frame 23. The method may also comprise biasing a spring 53 on each of the shipping brackets 51 into interlocking engagement with a respective one of the shelves 29 by merely inserting the drives 41 into the shelves 29, and using a tool 71 to disengage the springs 53 from the shelves 29 before the drives 41 can be removed from the frame 23. Finally, the method may comprise applying a compression force to the drives 41 to maintain the drives 41 in the shipping position during the shock and vibration of shipping.

The present invention has several advantages including the ability to safely ship tape drives while they are mounted to the frame of an automated tape library. The present invention utilizes a single shipment bracket to retain each drive within the frame in retracted positions during shipment. The shipment brackets allows the drives to be shipped inside the frame when the normal operating position of the drives is to protrude outside of the frame. This design provides a very simple installation and removal solution without adding the extra cost of separate shipping containers for the drives. Also, by moving the drives into the frame, the majority of the weight is now inside the frame so that the frame will not tip over as easily as prior art designs and thereby avoids a safety hazard during shipment. Additionally, the shipment brackets are relatively inexpensive and can be stored within the frame so that the frame can be shipped repeatedly without having to relocate the original packaging.

The function of the shipment bracket is to securely hold and restrain one drive in the frame in a retracted or shipment position. This position differs from the normal operating position of the drive wherein it protrudes from the frame. Prior to the present invention, there was no viable method of securely fastening drives within the frame in retracted positions that allowed them to be easily removed. The shipment bracket holds the drive in the retracted position within the frame by snapping into the drive itself and also to the shelves on which the drive sits.

When the spring is clipped on top of the drive, it can be inserted into the drive shelf. When the drive is inserted into the shelf, the middle section of the spring is ramped down as the drive slides into position. The drive continues to be pushed into position until the middle section of the spring is fully engaged with the shelf above the drive and the vertical tabs in the middle section have prevented the drive from further insertion. Because the middle section of the spring is engaged, the drive no longer can move in or out of the shelf. Also in this position, the middle section of the spring is compressed and applies a downward force to the top of the drive. This force can be set by the design of the spring and, in this embodiment, the force is equal to approximately three times the weight of the drive, but the compression force may vary based on the design of the spring. The compression force allows the position of the drive to be maintained during any shock or vibration during shipping. To disengage the spring, a lever may be used to pry down the middle section of the spring to disengage and then partially slide the drive out of the shelf. Once disengaged, the spring can be removed and stored within the frame.

While the invention has been shown or described in only some of its forms, it should be apparent to those skilled in the art that it is not so limited, but is susceptible to various changes without departing from the scope of the invention.

What is claimed is:

1. A method of increasing the safe handling an apparatus during shipping, said method comprising:
   providing a frame having a front, a rear, shelves inside the frame, drives, and shipping brackets;
   mounting a shipping bracket to each of the drives to form assemblies;
   inserting the assemblies into the shelves of the frame until the shipping brackets interlock with the shelves in a shipping position such that the drives are located inside the frame and movement of the drives is restricted by the shipping brackets;
   shipping the frame with the drives in the shipping position;
   removing the assemblies from the frame;
   removing the shipping brackets from the drives;
   inserting the drives into the shelves of the frame beyond the shipping position to a normal operating position such that at least portions of the drives extend out of the frame beyond the front of the frame.

2. The method of claim 1, wherein said method further comprises storing the shipping brackets inside the frame for subsequent use in retaining the drives in the shipping position.

3. The method of claim 1, wherein said inserting the assemblies step further comprises inserting the assemblies into the shelves at the rear of the frame and the drives are located completely inside the frame between the front and the rear of the frame in the shipping position, wherein said removing the assemblies step further comprises removing the assemblies from the rear of the frame, and wherein said inserting the drives step further comprises inserting the drives into the shelves at the rear of the frame beyond the shipping position.

4. The method of claim 1, wherein said inserting the assemblies step further comprises locating a majority of a weight of the drives inside the frame to enhance a stability of the frame.

5. The method of claim 1, wherein said inserting the assemblies step further comprises biasing a spring on each of the shipping brackets into interlocking engagement with a respective one of the shelves by merely inserting the drives into the shelves, and wherein said removing the assemblies step further comprises using a tool to disengage the springs from the shelves before the drives can be removed from the frame.

6. The method of claim 1, wherein said inserting the assemblies step further comprises applying a compression force to the drives to maintain the drives in the shipping position during shock and vibration.

* * * * *